(12) United States Patent
Lemon

(10) Patent No.: US 11,135,791 B2
(45) Date of Patent: Oct. 5, 2021

(54) GLASS RESTORATION APPARATUS AND METHOD

(71) Applicant: Charles Brian Lemon, Las Vegas, NV (US)

(72) Inventor: Charles Brian Lemon, Las Vegas, NV (US)

( * ) Notice: Subject to any disclaimer, the term of this patent is extended or adjusted under 35 U.S.C. 154(b) by 378 days.

(21) Appl. No.: 15/998,009

(22) Filed: Jun. 8, 2018

(65) Prior Publication Data

US 2018/0370166 A1  Dec. 27, 2018

Related U.S. Application Data

(62) Division of application No. 14/998,469, filed on Jan. 6, 2016, now Pat. No. 10,035,312.

(51) Int. Cl.
  *B29C 73/02*    (2006.01)
  *B29L 31/30*    (2006.01)

(52) U.S. Cl.
  CPC ..... *B29C 73/025* (2013.01); *B29L 2031/3052* (2013.01)

(58) Field of Classification Search
  None
  See application file for complete search history.

(56) References Cited

U.S. PATENT DOCUMENTS

| | | | |
|---|---|---|---|
| 2,284,602 A * | 5/1942 | Skinner | F16N 37/02 222/326 |
| 6,422,849 B1 * | 7/2002 | Grubb | B29C 73/025 264/36.21 |
| 9,027,796 B1 * | 5/2015 | Leitch | B05C 17/01 15/105 |

FOREIGN PATENT DOCUMENTS

WO    WO-2014-149890 A1 *  9/2014

* cited by examiner

*Primary Examiner* — Matthew J Daniels
*Assistant Examiner* — Mohammad M Ameen
(74) *Attorney, Agent, or Firm* — Thomas A. Turner, Jr.

(57) ABSTRACT

A damaged glass surface restoring tool comprises a replaceable, hermetically sealed container of glass fluid restoring substance aligned within a vacuum chamber perpendicularly to the glass surface. A method of restoring a damaged glass surface creates a vacuum in a chamber aligned over a crack in the glass and applying to the crack a glass restoring substance before being exposed to external air in a straight line path of application.

8 Claims, 5 Drawing Sheets

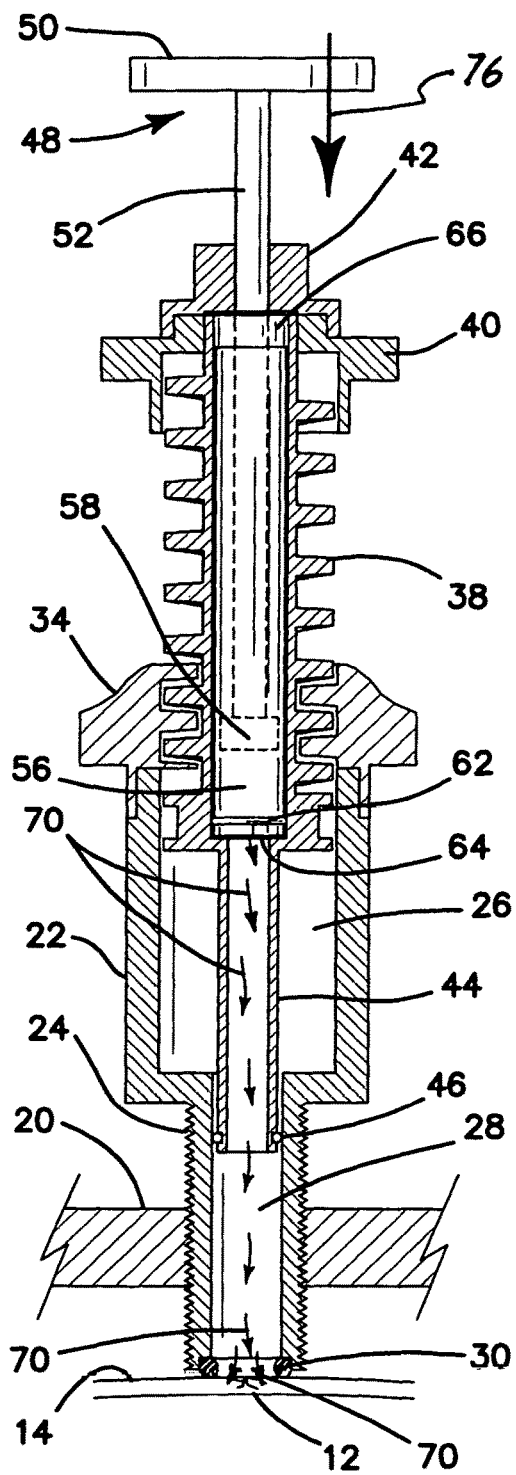
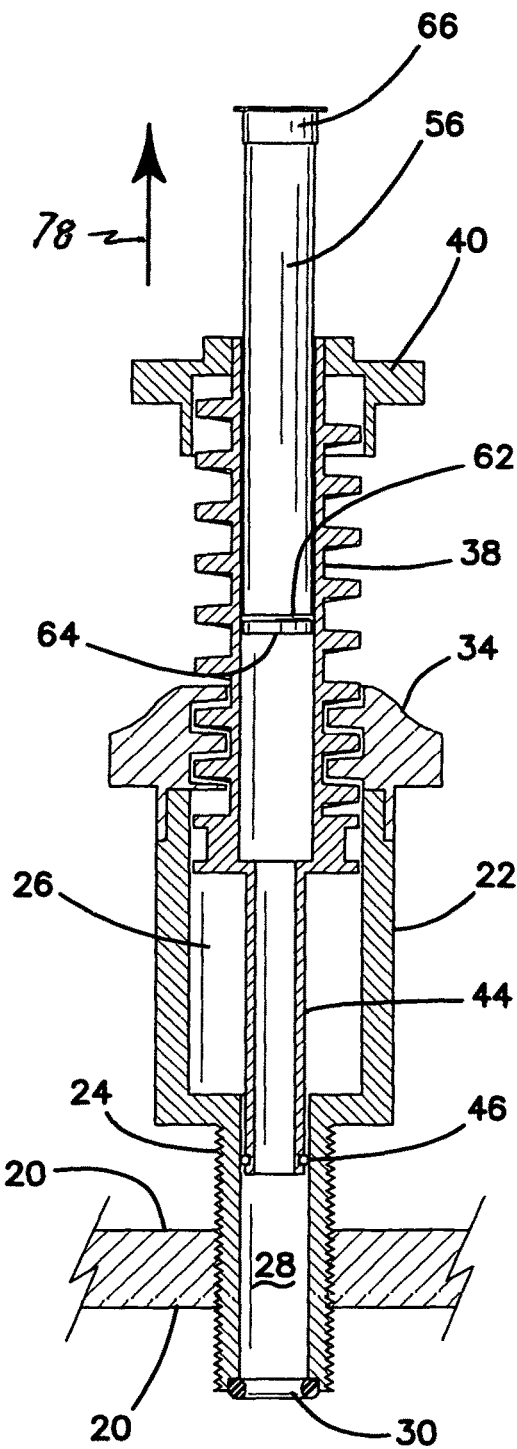
FIG. 6
FIG. 7

GLASS RESTORATION APPARATUS AND METHOD

CROSS-REFERENCE TO RELATED APPLICATION

This application is a division of U.S. application Ser. No. 14/998,469 filed on Jan. 6, 2016 in the United States Patent and Trademark Office of the United States of America, entitled "GLASS RESTORATION APPARATUS AND METHOD" by the Applicant herein, the entire content and disclosure of all of which are incorporated by this reference for all purposes including all priority of common subject matter and other benefit under Title 15 of the United States Code, Section 120.

BACKGROUND OF THE INVENTION

Field of the Invention

The present invention relates to the art of glass repair and restoration and more particularly to the art of restoring the surface of damaged glass and glass-like objects to their original condition by the use of vitreous substances.

Description of the Prior Art

In the past, it has been known to provide apparatuses to infuse vitreous substances in liquid, fluid form into cracks, scratches, chips, pits, holes, divots and like damage sustained by glass and glass-like surfaces, where the liquid substance after infusion is hardened or cured to substantially the same hardness as the glass being restored. Such damage is often sustained by automobile windshields when rocks and similar debris are thrown by wind or adjacent motor vehicles's tires. Typically, the restoring substance is inserted into the crack, scratch, chip, pit, hole, divot or the like, the surface is smoothed to coincide with the surface being restored, and the substance is allowed to set or to harden by curing. One such apparatus, and a method for using such an apparatus is shown, for an example, in Werner, et al., U.S. Pat. No. 3,993,520.

One of the problems experienced in restoring damaged glass is the presence of air bubbles and pockets finding their way into the vitreous substance before curing has completed. Apparatuses and methods for overcoming this problem have been shown which essentially provide a degree of vacuum over and within the crack, chip, scratch, hole, pit, divot or the like while inserting the substance in fluid form. See, for example, Boyle, et al., U.S. Pat. No. 8,092,203. Hereinafter in this specification, the term "crack" will be used to describe and include all like damage, such as, in addition to rough and smooth cracks, chips, scratches, pits, holes, divots, unintended indents and the like to the glass unless specifically stated otherwise. Similarly, the term "glass" will be used to refer to not only glass in its normal definition, but also to glass-like material, such as plastics and other vitreous material that are like glass in physical property or appearance.

The use of such apparatuses and methods requires the infusing of a fluid substance such as a resin or vitrescent through the apparatus and into the crack, where the substance cures or hardens into the desired location. After each such use, a new volume of the fresh liquid, fluid substance must be inserted or re-charged into the apparatus for the next use, and indeed again and again prior to each of all subsequent uses. Between each such use of the apparatus, the new volume of the fresh liquid substance, e.g. resin inserted or re-charged into the apparatus for its next use is exposed to air, and however slight, a curing inevitably begins. In those instances where a re-charge has been accomplished a length of time prior to actual use of the apparatus, the curing can be advanced. Premature curing can clog the apparatus, and can interfere with the application of the restoring substance. The resulting outcome of the restoring process can even be affected so that after finishing, the result will not be what is desired. If the effect is substantial, the ability to see clearly through the not-quite-so-restored glass may be detrimentally distorted.

It is an object of the present invention to provide an apparatus and a method for restoring glass surfaces to an original, transparent condition by infusing or inserting a fluid restoring material into cracks from a reservoir that is not exposed to air or other curing environments until immediately before the fluid substance is inserted into the crack. It is a further object of the present invention to provide an apparatus and method for receiving a restoring fluid substance for insertion into to cracks where the restoring substance is not exposed to air or other curing environments until the substance is injected into the cracks. It is yet a further object of the present invention to provide hermetically sealed containers or cartridges containing the fluid restoring substance which are openable only immediately prior to insertion of the substance into the crack in the glass to be restored. It is yet another object of the present invention to provide an apparatus for inserting fluid restoring substance into cracks of glass to be restored in a straight line directly into the cracks and where the fluid restoring substance is hermetically sealed until the insertion is initially commenced.

SUMMARY

In brief, in accordance with one aspect of the present invention, a glass crack repair tool is provided having an interior space to be positioned directly on to a glass surface and comprising an air extractor within the interior space which defines, with the glass surface and the interior space, a hermetically sealed chamber that extends generally perpendicularly from the crack. A charged, sealed cartridge containing a fluid, glass restoring substance is inserted into the chamber prior to fixing the interior space to the glass surface. The cartridge is unsealed and aligned within the chamber to be substantially perpendicular to the glass surface at the location of the crack. A cartridge extruder is provided capable of extruding the fluid substance from the cartridge. A method for restoring a crack in a glass is also described comprising positioning a repair tool having an air extractor against a glass surface to create a sealed chamber, wherein a cartridge containing a restoring substance is inserted within the chamber prior to fixing the repair tool against the glass surface, extracting air from the chamber to create a degree of vacuum within the chamber, and extruding the fluid restoring substance from the cartridge and into the crack through the vacuum chamber by way of a substantially straight line path from the cartridge to the crack.

These and other novel aspects of the present invention, together with other aspects thereof, can be better understood by the following detailed description of the preferred embodiments, which are designed to be read in conjunction and together with the accompanying drawings.

BRIEF DESCRIPTION OF THE DRAWINGS

FIG. 6 is a side elevation view having half of the repair tool cut away as seen in FIGS. 3 and 4 showing restoring substance being inserted in accordance with one aspect of the preferred embodiment of the present invention; and, FIG. 7 is a side elevation view having half of the repair tool cut away for clarity of view showing an extraction and replacement of a cartridge in accordance with one aspect of the preferred embodiment of the present invention.

DESCRIPTION OF THE PREFERRED EMBODIMENTS

Figure 1:
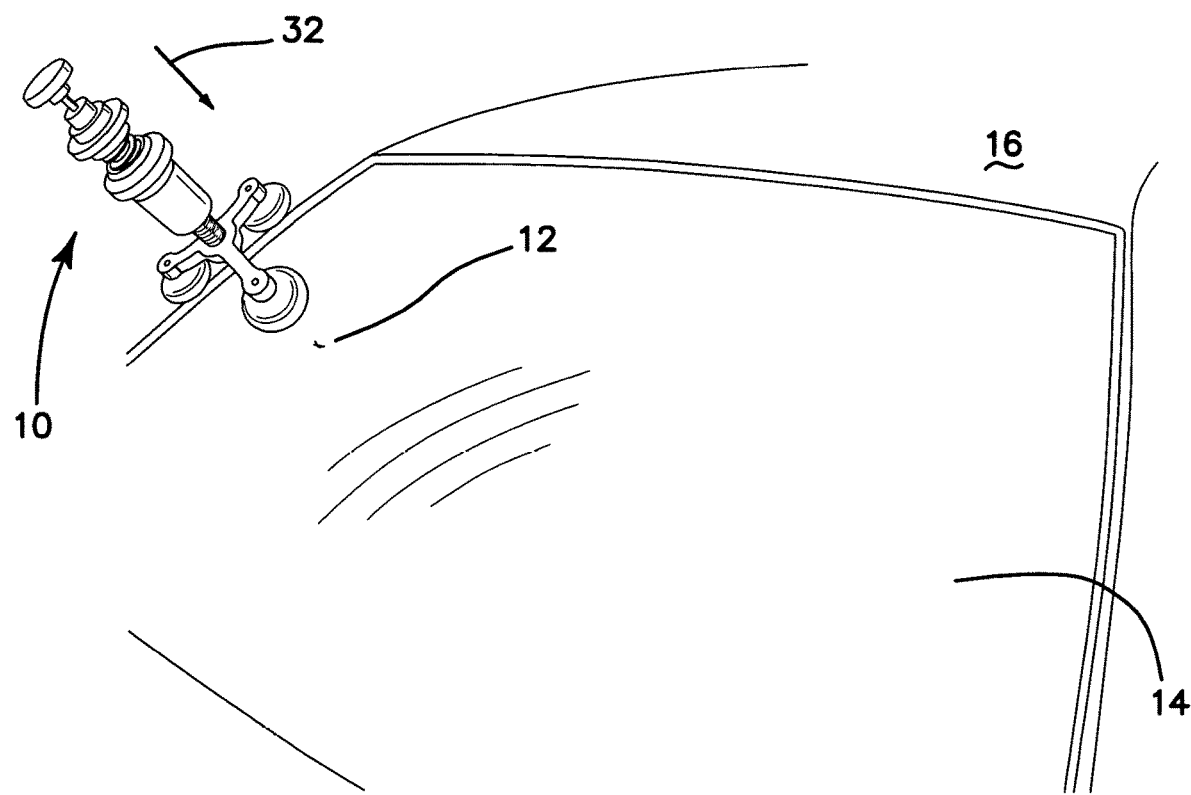
FIG. 1 is a perspective view of a repair tool apparatus of the preferred embodiment of the present invention being positioned onto a damaged surface.
Figure 2:
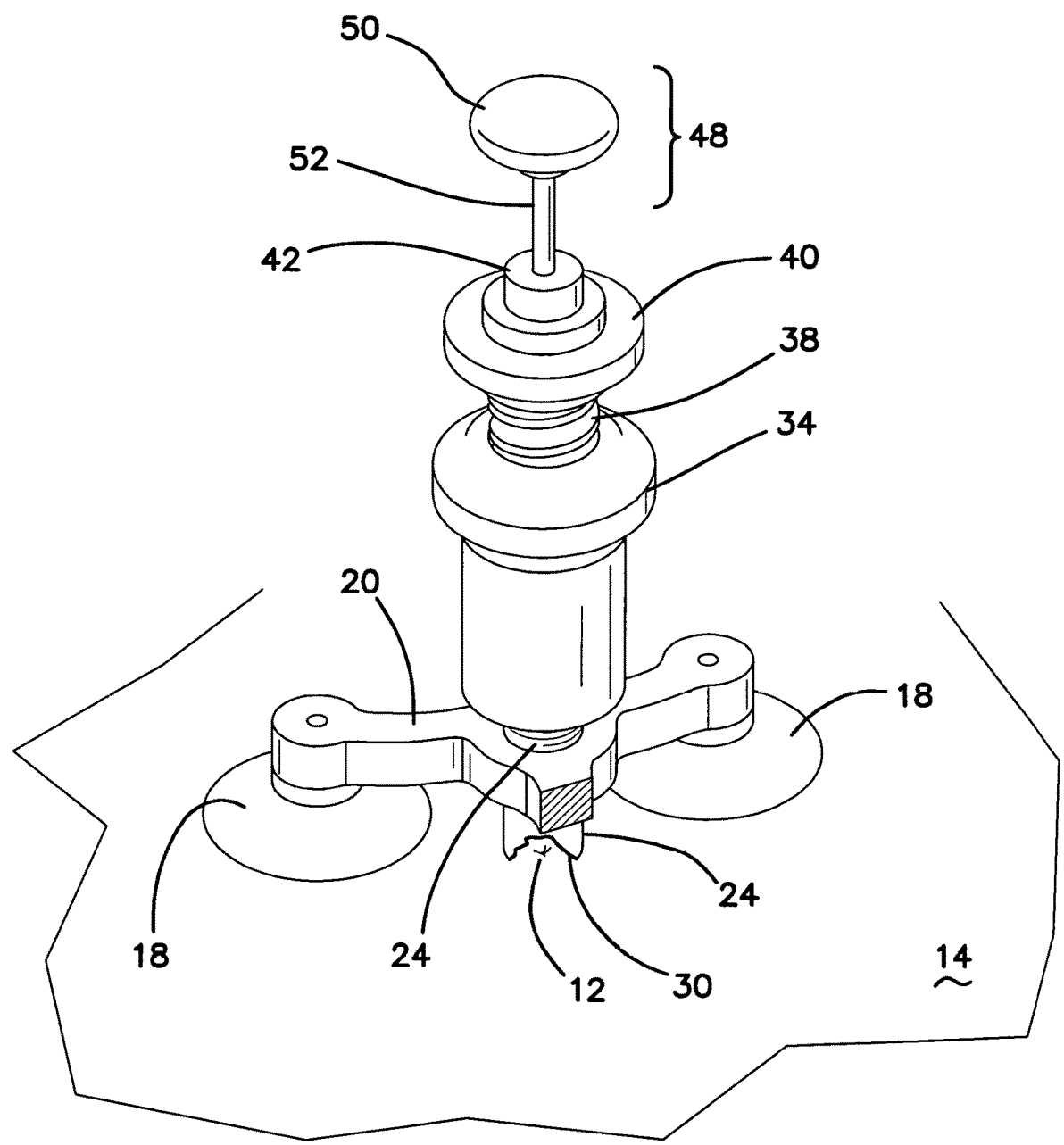
FIG. 2 is perspective view of the preferred embodiment with the repair tool fixed on the damaged surface of FIG. 1, having portions cut away for clarity of view.

A repair tool 10 is shown in proximity to a crack 12 in a windshield 14 of an automobile 16, reference being had initially to FIGS. 1 and 2 of the accompanying drawings where reference numerals used herein refer to like reference numerals in the drawings. In FIG. 1, the tool 10 is shown being positioned in the direction of arrow 32 over the crack 12. In FIG. 2, the tool 10 is shown in greater detail and positioned fixed on the windshield 14, where some portions of the tool 10 are depicted cut away for clarity in understanding the apparatus 10.

In FIG. 2, the tool 10 is shown fixed to the windshield 14 by the suction cups 18 of a three-prong base mount 20 comprised of three suction cups 18, one each attached to each of the three prongs. A vacuum cup 22 is shown having a vacuum cup extension 24.

Figure 3:
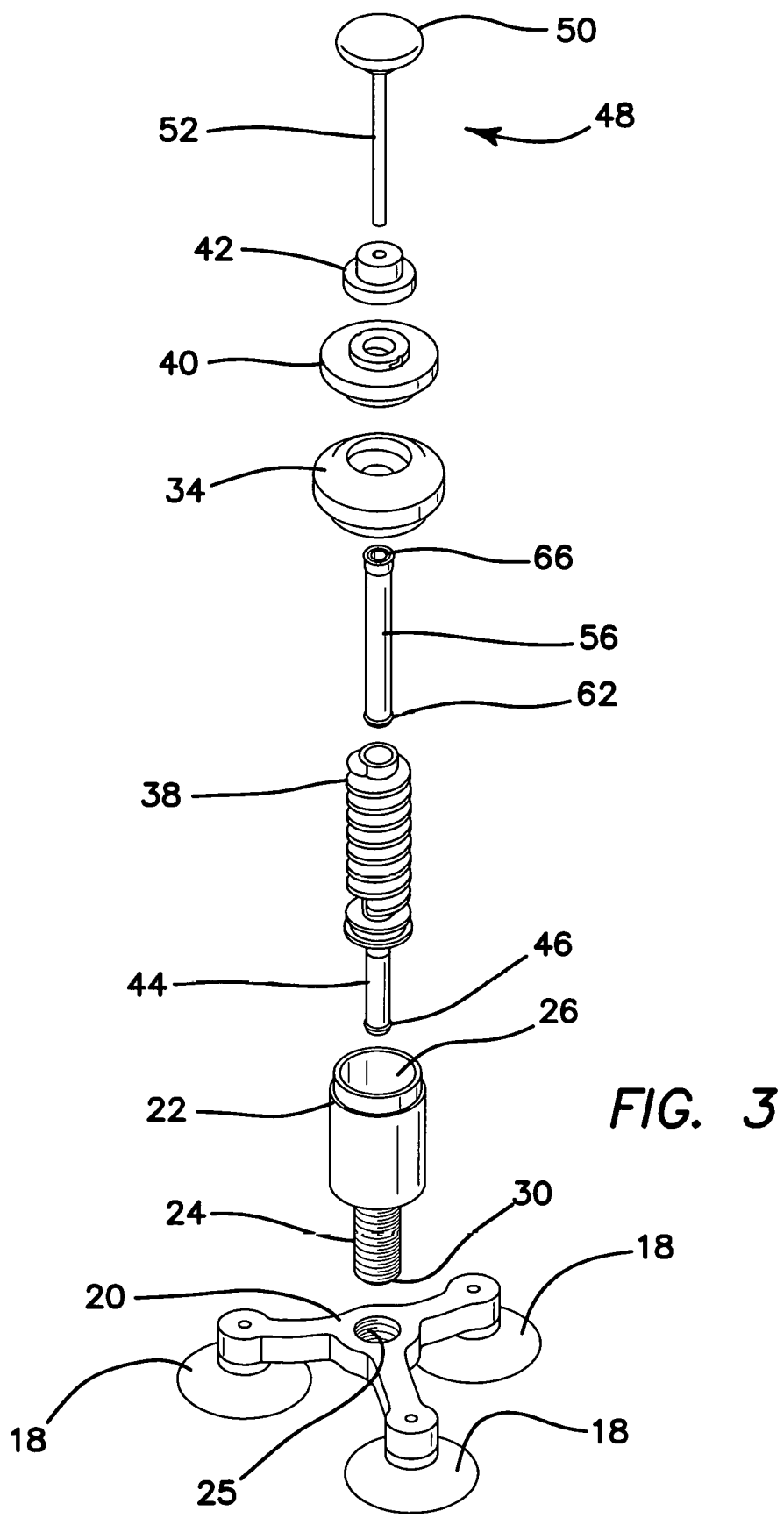
FIG. 3 is a perspective view of the preferred embodiment of the present invention of FIGS. 1 and 2 having the component parts exploded for clarity.

Referring now to FIG. 2 and to FIG. 3, where the tool 10 is shown in exploded view to show in greater detail all of the component parts of tool 10 as well as some additional parts for ease in understanding the invention, the vacuum cup extension 24 has threads on its outside, which are complemental to threads in the hole 25 through the base mount 20. The threaded extension 24 is received by threaded fastening with the complemental threads of hole 25 of the base mount 20 to secure not only the extension 24 to the base mount 20, but also to secure the vacuum cup 22 which is integral with the vacuum cup extension 24. The vacuum cup 22 has an interior space 26 within its upper portion. The extension 24 has attached to its lower extremity a lower lip 30 in the form of an O-ring. The vacuum cup 24 and its extension 24 have a common, coaxial interior space which will be described and shown in greater detail below. The vacuum cup 22 has mounted and fixed at its upper end a vacuum cup cap 34.

The vacuum cup cap 34 has a central circular open interior having threads. An air extractor 38 has threads on its outside complemental to the threads of the opening in vacuum cup cap 34. The air extractor 38 has an air extractor top handle 40 which is mounted and fixed to the top of air extractor 38, so that when the top handle 40 is turned, the air extractor 34 is turned exactly the same in the same rotary direction. An air extractor top handle cap 42 is designed to fit and be placed atop the top handle 40, as will be described and shown in greater detail below.

The air extractor 38 has an air extractor extension 44 integral with and extending below the air extractor 38. The air extractor extension 44 has an air extractor O-ring 46 around its lower end shaped to engage and provide an air seal with the interior space of the lower portion of the vacuum cup extension 24. The air extractor extension 44 and the air extractor 38 have a common, coaxial cylindrical interior space which will be described and shown in greater detail below.

A cartridge extruder 48 comprises a cartridge extruder head 50 connected to a cartridge extruder plunger 52. The extruder plunger 52 is designed to fit, and to pass through an opening in the air extractor top handle cap 42.

Continuing to refer to FIG. 3, a cartridge 56 has a cartridge cap 66 which holds or seats a bulb-like piston 58, which is capable of being dislodged or unseated downwardly. At its other end, the cartridge 56 has a cartridge O-ring 62 for fitting within the interior space of the air extractor 38 and its extension 44. The cartridge 56 will be charged with the fluid restoring substance until it is fitted within the tool 10. Until the cartridge 56 is fitted within the tool 10, as will be described in greater detail below, the end 64 will have an easily removable covering 60 such as a thin plastic with an adhesive around its edge to hold the fluid substance inside the cartridge 56.

Figure 4:
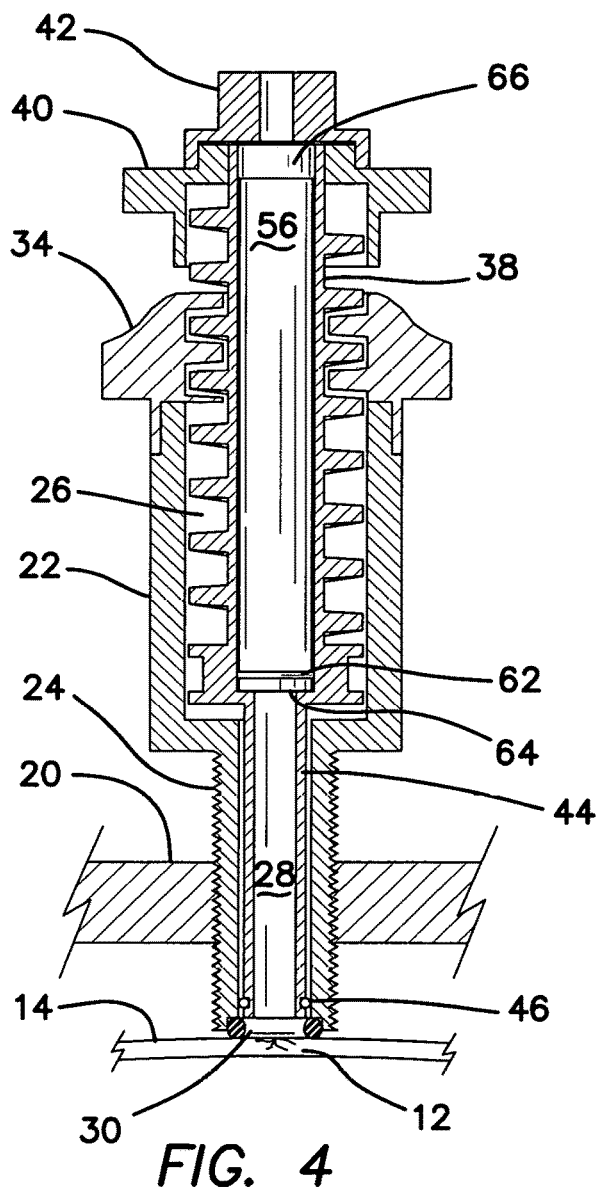
FIG. 4 is a side elevation view of the preferred embodiment of the present invention shown in FIG. 2 having half of the repair tool cut away to show interior detail.

In FIG. 4 the commencement of the operation of repairing and restoring the damaged glass 14 is shown. The base mount 20 is attached by suction cups 18 to the windshield 14, and the vacuum cup 22 is screwed by virtue of turning the vacuum cup extension 24 through the base mount hole 25, seen better in FIG. 2, until the lip 30 engages the windshield 12 and makes a seal around the crack 12. Initially, the air extractor 38 with its integral extension 44 is inserted into the interior space 26 of the vacuum cup 22, until the further end of the extension 44 abuts the vacuum cup extension lip 30. The vacuum cup cap 34 is fixed onto the vacuum cup 22 by first threading the cap 34 onto the air extractor 38 at its upper end. The vacuum cup cap 34 is then fixed to the vacuum cup 22, so that by turning the vacuum cup cap 34 the vacuum cup 22 will turn in the same rotary direction. The air extractor top handle 40 then is fixed onto the air extractor 38. Similarly, turning the air extractor top handle 40 will turn the air extractor 38 in the same rotary direction. The cartridge 56 has been charged with the fluid substance which is to be injected into the crack 12. The thin plastic seal 60 at the end 64 of the cartridge 56 is removed and the cartridge 56 is inserted into the interior space of the air extractor 38 to the level where the air extractor extension 44 begins. The air extractor top handle cap 42 is capped onto the air extractor handle 40. At this point, the windshield 12, the vacuum cup extension 24 with the air extractor extension 44 therein, and the cartridge 56 define an interior space or chamber 28 that is hermetically sealed. The cartridge O-ring seal 62 seals the chamber 28 to prevent any air from escaping through the upper portion of the interior of the air extractor 38. The resulting positioning aligns the axis of the cylindrical cartridge 56 coaxially with the vacuum cup 22 and its cylindrical interior space 26 as well as with the cylindrical interior of air extractor 38, and this alignment is substantially perpendicular to the surface 14, so that there is a direct path or line for the flow of the fluid substance from the cartridge 56 to the crack 12. In addition, the flow will be substantially perpendicular to the surface 14.

Figure 5:
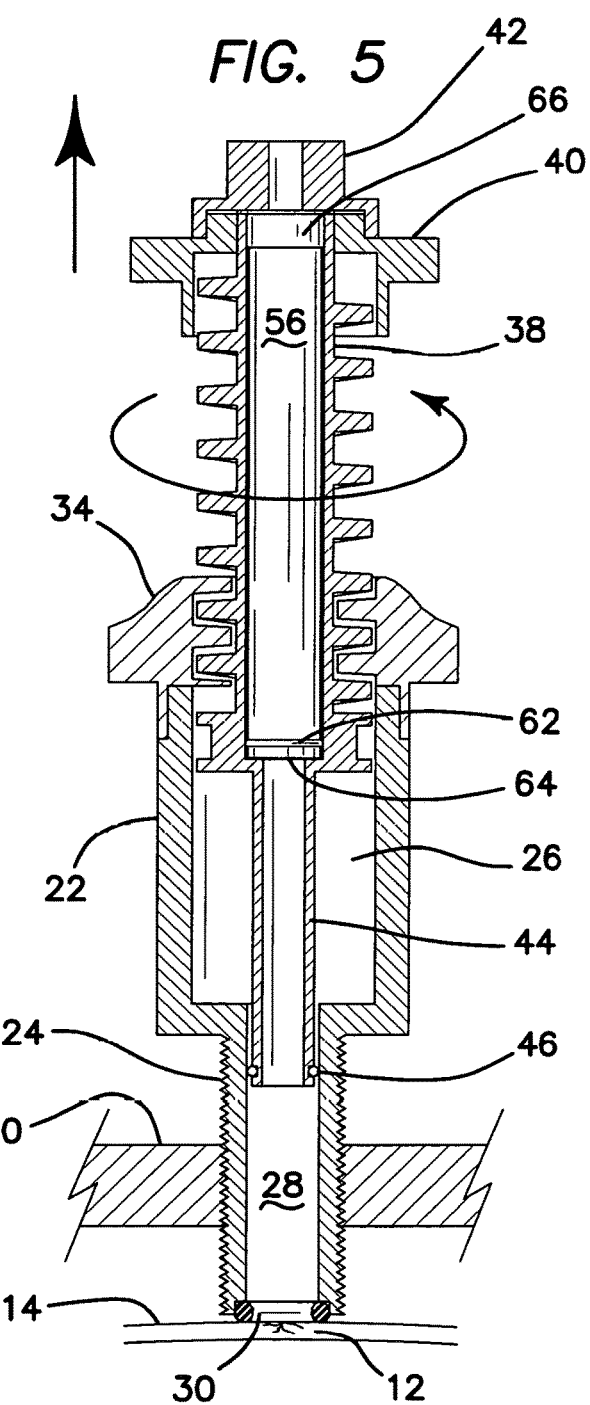
FIG. 5 is a side elevation view having half of the repair tool cut away as seen in FIG. 4 showing air being extracted from a chamber in the operation of one aspect of the preferred embodiment of the present invention.

In FIG. 5, the next step in the operation of restoring the windshield 14 is shown. By turning the air extractor top handle 40 in the counter-clockwise direction of the arrow 72, the air extractor 38 is moved relative to the vacuum cup 22 upwardly in the direction of arrow 74. This action expands the hermetical chamber 28 as the air extractor extension 44, integral with the air extractor 38, is moved upwardly as well. Note in this regard that the air extractor O-ring 46 seals the chamber 28 and prevents any air escape around the air extractor extension 44. The chamber 28, being thus hermetically sealed, has a degree of vacuum established therein.

In FIG. 6, the next step in the operation of restoring the damaged windshield 14 is shown, where the cartridge extruder plunger 52 of the cartridge extruder 48 is inserted through the opening in the air extractor top handle cap 42. The cartridge extruder head 50 is plunged downwardly in the direction of arrow 76 so that the end of the cartridge extruder plunger 52 engages the cartridge piston 58 to dislodge it from the cartridge cap 66 to engage and force the fluid restoring substance therein downwardly and out through the cartridge end opening 64, and to flow into the chamber 28, all in the direction of the arrows 70 and into the crack 12 of the windshield 14 in a direct, straight line or path.

In FIG. 7, the next step in the operation of restoring the damaged windshield 14 is shown where cartridge extruder 48 is removed along with the air extractor top handle cap 42. The air extractor top handle cap 42 and the cartridge extruder 48 may be installed and/or removed as a unit; that is to say, the cap 42 and the extruder 48 may be handled separately or together as a unit. Further, the tool 10 is removed from its engagement with the windshield 14 either by separating the suction cups 18 from the windshield 14, or by screwing the vacuum cup extension 24 in the counter-clockwise direction and lifting the vacuum cup 22 and the assembly associated with it upwardly.

The then discharged cartridge 56 is removed from the tool 10 through the air extractor top handle 40 as shown in the direction of arrow 78. The spent cartridge 56 may be discarded, or may be re-charged with the fluid substance with which the crack has now been filled. A user of the present invention may keep a supply of charged cartridges 56 for quick and ready re-use of the tool 10. In such storage the fluid restoring substance will be kept sealed hermetically from contaminants, and from air and any other environment that might commence curing. The composition of the substance used in this restoration or repair process is not a part of the present invention herein. The composition of the substance used may be any desired resin or vitrescent or of any vitreous composition that will harden and cure as has been used in the past to restore glass surfaces and as are well known to those skilled in the art.

By using the foregoing steps, it may be appreciated that an apparatus is provided that allows for applying a restoring fluid substance to repair or restore a damaged glass surface such as a windshield 14, directly in a straight line from a supply of the fluid restoring substance, such as a cartridge 56 having a supply of the restoring substance, directly to a damage such as a crack 12 in the glass surface such as a windshield 14. The fluid substance is maintained within a sealed container such as cartridge 56, hermetically sealed from any exposure to air or any other environment that would start the curing process, and is continued to be so maintained until the fluid restoring substance is instantly conveyed to the damaged area through another hermetically sealed path or conduit created by creating a vacuum in that path, such as chamber 28, to the damaged area. Modifications may be perceived by those skilled in the art which will accomplish the same objectives as shown herein.

The foregoing detailed description of my invention and of preferred embodiments as to products, compositions and processes, is illustrative of specific embodiments only. It is understood, however, that additional embodiments may be perceived by those skilled in the art. The embodiments described herein, together with those additional embodiments, are considered to be within the scope of the present invention.

I claim:

1. A method of repairing a crack in a surface comprising the steps of:
   a. positioning a repair tool including a chamber having a lip and having within said chamber a cartridge charged with a fluid substance over said crack, whereby said lip surrounds the crack on said surface and hermetically seals said chamber against said surface to create an hermetic space defined by said chamber and said surface;
   b. aligning, if not aligned in a preceding step, said cartridge over and substantially perpendicular to said crack;
   c. extracting air pressure from said chamber having said cartridge there within without exposing said hermetic space to air external to said space to create a degree of vacuum within said chamber; and,
   d. extruding said fluid substance from said cartridge wherein a plunger is moved substantially perpendicularly toward said surface and through said cartridge to extrude said fluid substance from said cartridge through said lip and into said crack while maintaining said degree of vacuum within said hermetic space.

2. The method of claim 1 wherein said positioning step, said cartridge is replaceable.

3. The method of claim 2 further comprising the steps of:
   a. removing said chamber from said surface after said extruding step and discarding said replaceable cartridge; and,
   b. inserting into said chamber a replaceable cartridge charged with a fluid substance.

4. The method of claim 1 wherein said positioning step, said cartridge is rechargeable.

5. A method of repairing a crack in a surface comprising the steps of:
   a. positioning a repair tool including a chamber having a lip and having within said chamber a cartridge charged with a fluid substance over said crack, whereby said lip surrounds the crack on said surface and hermetically seals said chamber against said surface to create an hermetic space defined by said chamber and said surface;
   b. aligning, if not aligned in a preceding step, said cartridge over and substantially perpendicular to said crack;
   c. extracting air pressure from said chamber having said cartridge there within without exposing said hermetic space to air external to said space to create a degree of vacuum within said chamber; and,
   d. extruding said fluid substance from said cartridge wherein a plunger is moved substantially perpendicularly toward said surface and through said cartridge to extrude said fluid substance from said cartridge through said lip and into said crack without exposing said space to air external to said hermetic space whereby during said extruding step, said degree of vacuum within said hermetic space is substantially maintained.

6. The method of claim 5 wherein said positioning step, said cartridge is replaceable.

7. The method of claim 6 further comprising the steps of:
a. removing said chamber from said surface after said extruding step and discarding said replaceable cartridge; and,
b. inserting into said chamber a replaceable cartridge charged with a fluid substance.

8. The method of claim 5 wherein said positioning step, said cartridge is rechargeable.

\* \* \* \* \*